(12) United States Patent
Nakahira et al.

(10) Patent No.: US 11,991,546 B2
(45) Date of Patent: May 21, 2024

(54) WIRELESS COMMUNICATION SYSTEM, CONTROL STATION DEVICE AND WIRELESS BASE STATION DEVICE

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 296 days.

(21) Appl. No.: 17/602,216

(22) PCT Filed: Mar. 24, 2020

(86) PCT No.: PCT/JP2020/013141
§ 371 (c)(1),
(2) Date: Oct. 7, 2021

(87) PCT Pub. No.: WO2020/209054
PCT Pub. Date: Oct. 15, 2020

(65) Prior Publication Data
US 2022/0201521 A1 Jun. 23, 2022

(30) Foreign Application Priority Data

Apr. 9, 2019 (JP) ................................ 2019-074274

(51) Int. Cl.
*H04W 24/08* (2009.01)
*H04L 12/26* (2006.01)

(52) U.S. Cl.
CPC .................................. *H04W 24/08* (2013.01)

(58) Field of Classification Search
None
See application file for complete search history.

(56) References Cited

U.S. PATENT DOCUMENTS

2016/0277953 A1* 9/2016 Andersson .............. H04L 65/80
2017/0126853 A1* 5/2017 Goel ....................... H04L 67/60

OTHER PUBLICATIONS

NEC Corporation, On-site maintenance (visit maintenance), literature, Feb. 18, 2019 (Reading Day), https://jpn.nec.com/service/support/maintenance/service/onsite.html.

* cited by examiner

*Primary Examiner* — Scott M Sciacca
(74) *Attorney, Agent, or Firm* — Harness, Dickey & Pierce, P.L.C.

(57) ABSTRACT

A radio base station device includes a plurality of radio units that perform communication with a radio terminal device, a packet data collection unit that collects packet data communicated by the plurality of radio units on the basis of a packet collection policy, a collected packet data analysis unit that performs analysis on packet data on the basis of a packet analysis policy, and transmits analysis result information to the control station device, and an information processing unit that transmits base station performance information and analysis result information to the control station device, and receives a packet collection policy and a packet analysis policy. The control station device includes a packet collection and analysis policy generation unit that generates and transmits the packet collection policy and the packet analysis policy to the radio base station device, on the basis of the base station performance information, and a data analysis unit that analyzes the analysis result information notified from the radio base station device.

8 Claims, 7 Drawing Sheets

Fig. 3

| POLICY NO. | PACKET COLLECTION POLICY ||| PACKET ANALYSIS POLICY |||
|---|---|---|---|---|---|---|
| | COLLECTION ITEM | COLLECTION METHOD | COLLECTION CONDITION | ANALYSIS ITEM | ANALYSIS METHOD | DETERMINATION CONDITION |
| I | ALL PACKETS BEING TRANSMITTED AND RECEIVED BY OWN STATION | • PERFORMED EACH HOUR<br>• COLLECTION TIME 1 MINUTE<br>• COMMUNICATION CHANNEL OF OWN STATION | • ONE OR MORE TERMINALS ARE CONNECTED TO OWN STATION | RETRANSMISSION RATE | FOR EACH DESTINATION, AVERAGE RETRANSMISSION PACKET RATE FOR EACH OF UPSTREAM AND DOWNSTREAM DIRECTION | RETRANSMISSION PACKET RATE IS 20% OR LESS |
| | | | | DATA RATE | FOR EACH DESTINATION, AVERAGE DATA RATE FOR EACH OF UPSTREAM AND DOWNSTREAM DIRECTIONS | DATA RATE IS 16 Mbps OR HIGHER |
| | | | | RADIO DISCONNECTION SIGNAL | Reason Code IN SIGNAL | Reason Code IS IN PRESCRIBED RANGE |
| | | | | RECEIVED POWER | FOR EACH DESTINATION, AVERAGE RECEIVED POWER FOR UPSTREAM DIRECTION | RECEIVED POWER IS -75dBm OR MORE |
| | | | | ... | ... | ... |
| II | ALL PACKETS BEING TRANSMITTED AND RECEIVED BY OTHER THAN OWN STATION | • PERFORMED EACH HOUR<br>• COLLECTION TIME 1 MINUTE<br>• COMMUNICATION CHANNEL OF OWN STATION | NONE | TRAFFIC AMOUNT | FOR EACH SOURCE, AVERAGE TRAFFIC FOR EACH OF UPSTREAM AND DOWNSTREAM DIRECTIONS | NONE |
| | | | | AIRTIME | FOR EACH SOURCE, AIRTIME OCCUPANCY RATE FOR EACH OF UPSTREAM AND DOWNSTREAM DIRECTIONS | NONE |
| | | | | ... | ... | ... |
| ... | ... | ... | ... | ... | ... | ... |

Fig. 4

| PACKET INFORMATION | | | | | | | | | | | | |
|---|---|---|---|---|---|---|---|---|---|---|---|---|
| | | | RADIO INFORMATION | | | | | PAYLOAD INFORMATION | | | | |
| NO. | DATE/TIME | ... | SOURCE MAC ADDRESS | DESTINATION MAC ADDRESS | COMMUNI-CATION PROTOCOL | DATA SIZE | RADIO PARAME-TER | ... | SOURCE IP ADDRESS | DESTINATION IP ADDRESS | COMMUNI-CATION PROTOCOL | DATA SIZE | ... |
| 1 | 2018/09/12 15:30:01 | ... | aa:bb:cc:dd:ee:ff | ab:cd:ef:ab:cd:ef | Data | 1500 Byte | ... | ... | 1.1.1.1 | 2.2.2.2 | TCP | 1450 Byte | ... |
| 2 | 2018/09/12 15:30:02 | ... | aa:bb:cc:dd:ee:ff | ab:cd:ef:ab:cd:ef | Data | 3000 byte | ... | ... | 1.1.1.1 | 3.3.3.3 | TCP | 2900 byte | ... |
| 3 | 2018/09/12 15:30:03 | ... | aa:bb:cc:dd:ee:ff | ab:cd:ef:ab:cd:ef | Data | 1500 Byte | ... | ... | 1.1.1.1 | 4.4.4.4 | TCP | 1400 Byte | ... |
| ... | ... | ... | ... | ... | ... | ... | ... | ... | ... | ... | ... | ... | ... |

Fig. 5

| NO. | RADIO BASE STATION NO. | PACKET COLLECTION AND ANALYSIS POLICY NO. | PACKET COLLECTION DATE/TIME | PACKET ANALYSIS DATE/TIME | PACKET ANALYSIS RESULT | PACKET DETERMINATION RESULT |
|---|---|---|---|---|---|---|
| 1 | 102(1) | I | 2018/09/12 16:16 | 2018/09/12 16:17 | • RETRANSMISSION PACKET RATE: 4%<br>• DATA RATE: AVERAGE 42 Mbps<br>• RADIO DISCONNECTION SIGNAL: NO DEVIATION FROM PRESCRIBED RANGE<br>• RECEIVED POWER: -65 dBm | • RETRANSMISSION PACKET RATE: OK<br>• DATA RATE: OK<br>• RADIO DISCONNECTION SIGNAL: OK<br>• RECEIVED POWER: OK |
| 2 | 102(N) | II | 2018/09/12 16:18 | 2018/09/12 16:19 | • TRAFFIC AMOUNT: 4 Mbps<br>• AIRTIME: 40% | NONE |
| ... | ... | ... | ... | ... | ... | ... |

WIRELESS COMMUNICATION SYSTEM, CONTROL STATION DEVICE AND WIRELESS BASE STATION DEVICE

CROSS-REFERENCE TO RELATED APPLICATIONS

This application is a 371 U.S. National Phase of International Application No. PCT/JP2020/013141 filed on Mar. 24, 2020, which claims priority to Japanese Application No. 2019-074274 filed on Apr. 9, 2019. The entire disclosures of the above applications are incorporated herein by reference.

TECHNICAL FIELD

The present invention relates to a radio communication system, a control station device, and a radio base station device.

BACKGROUND ART

As a high-speed radio access system using a radio wave of a frequency band not requiring a license, in the wireless LAN conforming to IEEE 802.11 standard, various standards such as IEEE 802.11a, 11b, 11g, 11n, and 11ac are defined, and the used radio frequency bands, radio transmission techniques, the radio transmission speeds, and the like are different from each other. In the IEEE 802.11b standard, a radio transmission speed of 11 Mbps at maximum can be used on a 2.4 GHz band, in the IEEE 802.11a standard, a radio transmission speed of 54 Mbps at maximum can be used on a 5 GHz band, and in IEEE 802.11g standard, a radio transmission speed of 54 Mbps at maximum can be used on a 2.4 GHz band. Moreover, in the IEEE 802.11n standard, a radio transmission speed of 600 Mbps at maximum can be used on a 2.4 GHz band and a 5 GHz band, and in the IEEE 802.11ac standard, a radio transmission speed of 6900 Mbps at maximum can be used on a 5 GHz band. In the wireless LAN conforming to various IEEE 802.11 standards as described above, backward compatibility is secured, so that it can be used in a communication environment where a plurality of standards are mixed.

On the other hand, in public areas such as stations, airports, shopping malls, and stadiums, wireless LAN connection services are often provided for users in public areas for attracting customers and improvements in user satisfaction. In a wireless LAN connection service for users in a public area, in order to maintain a service providing state, it is necessary to remotely perform maintenance and monitoring such as checking of a connecting state and a service providing state via a network, and when a trouble such as a device failure or a connection failure is detected, an operator must visit the site to perform investigation, test, device replacement, or the like (for example, refer to Non-Patent Literature 1).

CITATION LIST

Non-Patent Literature

Non-Patent Literature 1:
https://jpn.nec.com/service/support/maintenance/service/onsite.html

SUMMARY OF THE INVENTION

Technical Problem

In the case of performing maintenance and monitoring of a wireless LAN connection service remotely via a network, although it seems that there is no problem from the operation logs and remote monitoring, a trouble such as a connection failure may occur when an attempt is made to actually use the wireless LAN connection service. When such a trouble occurs and a contact is made from the area owner or the like providing the wireless LAN connection service to a person in charge of operation and maintenance, the person in change visits the site and checks the service condition and the failure and performs works to eliminate the failure cause. This causes a problem that workload and operation are required.

An object of the present invention is to provide a radio communication system, a control station device, and a radio base station device in which a radio base station utilizes part of the radio means of the own station for maintenance and monitoring on the basis of the monitoring policy of the radio base station notified from a control station to thereby reduce workload and operation by eliminating a need of dispatching a person in charge of maintenance and operation to the site, which has been required conventionally, when a trouble is caused, and a problem can be detected in advance before a trouble becomes apparent in the client site by remotely performing maintenance and monitoring regularly, resulting in reduction of claims from the client and improvements of the service quality.

Means For Solving the Problem

A first invention is characterized in that a radio communication system includes at least one radio base station device, and a control station unit that controls the radio base station device. The radio base station device includes a plurality of radio units that perform communication of packet data with a radio terminal device, a packet data collection unit that collects the packet data communicated by the plurality of radio units, on the basis of a packet collection policy received from the control station device, a collected packet data analysis unit that performs analysis on the packet data collected by the packet data collection unit on the basis of a packet analysis policy received from the control station device, and transmits analysis result information to the control station device, and an information processing unit that transmits base station performance information of the own device and the analysis result information to the control station device, and receives the packet collection policy and the packet analysis policy from the control station device. The control station device includes a packet collection and analysis policy generation unit that generates and transmits the packet collection policy and the packet analysis policy to the radio base station, on the basis of the base station performance information received from the radio base station device; and a data analysis unit that analyzes the analysis result information notified from the radio base station device.

A second invention is characterized in that, in the first invention, the data analysis unit transmits a collected packet data acquisition signal to the radio base station device, and causes the packet data corresponding to the analysis result information collected by the packet data collection unit of the radio base station device to be transmitted to the control station device.

A third invention is characterized in that, in the second invention, the radio base station device determines whether or not a collection condition in the packet collection policy is satisfied, and when the collection condition is satisfied, the radio base station device performs collection of the packet data.

A fourth invention is characterized in that a control station device that controls at least one radio base station device includes a packet collection and analysis policy generation unit that generates and transmits a packet collection policy and a packet analysis policy to the radio base station device, on the basis of base station performance information received from the radio base station device, and a data analysis unit that analyzes analysis result information that is collected and analyzed by the radio base station device on the basis of the packet collection policy and the packet analysis policy.

A fifth invention is characterized in that, in the fourth invention, the data analysis unit transmits a collected packet data acquisition signal to the radio base station device, and causes the packet data corresponding to the analysis result information collected by the radio base station device to be transmitted.

A sixth invention is characterized in that at least one radio base station device to be controlled by a control station device includes a plurality of radio units that perform communication of packet data with a radio terminal device, a packet data collection unit that collects the packet data communicated by the plurality of radio units on the basis of a packet collection policy received from the control station device, a collected packet data analysis unit that performs analysis on the packet data collected by the packet data collection unit on the basis of a packet analysis policy received from the control station device, and transmits analysis result information to the control station device, and an information processing unit that transmits base station performance information of the own device and the analysis result information to the control station device, and receives the packet collection policy and the packet analysis policy from the control station device.

A seventh invention is characterized in that in the sixth invention, when the information processing unit receives a collected packet data acquisition signal from the control station device, the information processing unit transmits the packet data corresponding to the analysis result information to the control station device.

An eighth invention is characterized in that, in the seventh invention, the packet data collection unit determines whether or not a collection condition in the packet collection policy is satisfied, and when the collection condition is satisfied, the packet data collection unit performs collection of the packet data on the basis of the packet data collection policy.

Effects of the Invention

In the radio communication system, the control station device, and the radio base station device according to the present invention, a radio base station utilizes part of the radio means of the own station for maintenance and monitoring on the basis of the monitoring policy of the radio base station notified from a control station to thereby reduce workload and operation by eliminating a need of dispatching a person in charge of maintenance and operation to the site, which has been required conventionally, when a trouble is caused, and a problem can be detected in advance before a trouble becomes apparent in the client site by monitoring regularly, resulting in reduction of claims from the client and improvements of the service quality.

BRIEF DESCRIPTION OF DRAWINGS

FIG. 3 illustrates examples of packet collection policies and packet analysis policies.

FIG. 4 illustrates examples of collected packet data.

FIG. 5 illustrates examples of collected packet analysis result information.

DESCRIPTION OF EMBODIMENTS

Hereinafter, an embodiment of a radio communication method, a control station device, and a radio base station device according to the present invention will be described with reference to the drawings. Note that in the embodiment provided below, a control station device is referred to as a control station, a radio base station device is referred to as a radio base station, and a radio terminal device is referred to as a radio terminal station.

Figure 1:
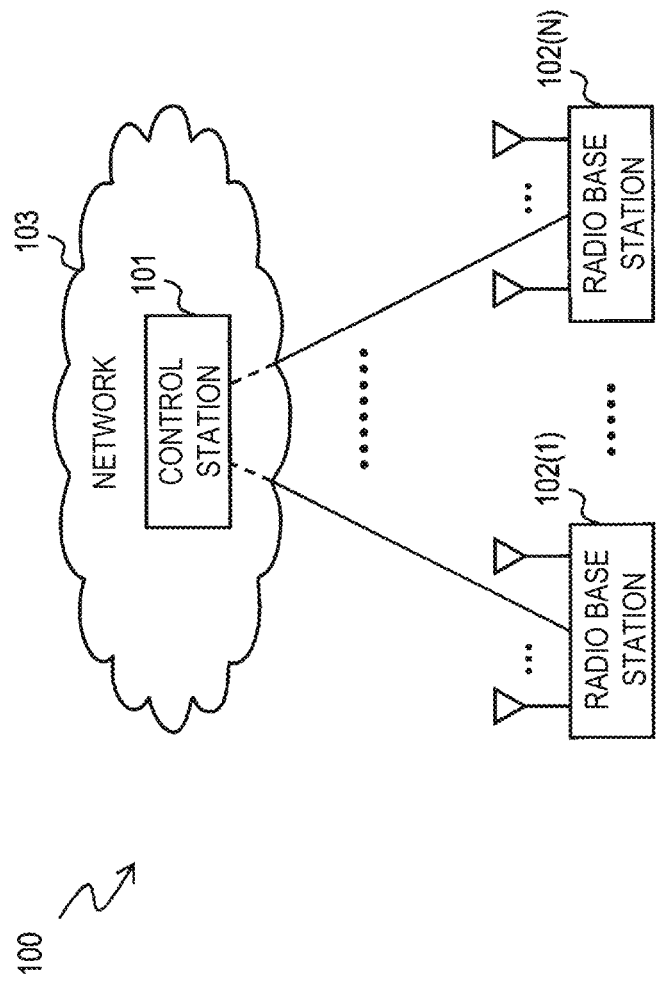
FIG. 1 illustrates an example of a radio communication system according to the present embodiment.

FIG. 1 illustrates an example of a radio communication system 100 according to the present embodiment. In FIG. 1, the radio communication system 100 includes a control station 101, radio base stations 102(1) to 102(N) (N is a positive integer), and a network 103 connecting the control station 101 and N units of radio base stations 102.

Here, in the description provided below, in the case of providing description common to the radio base stations 102(1) to 102(N), the (number) at the end of the reference numeral is omitted and it is described as a radio base station 102. In the case of indicating a specific radio base station 102, the (number) is added to the end of the reference numeral, like a radio base station 102(1), for example. The same applies to other blocks.

Figure 2:
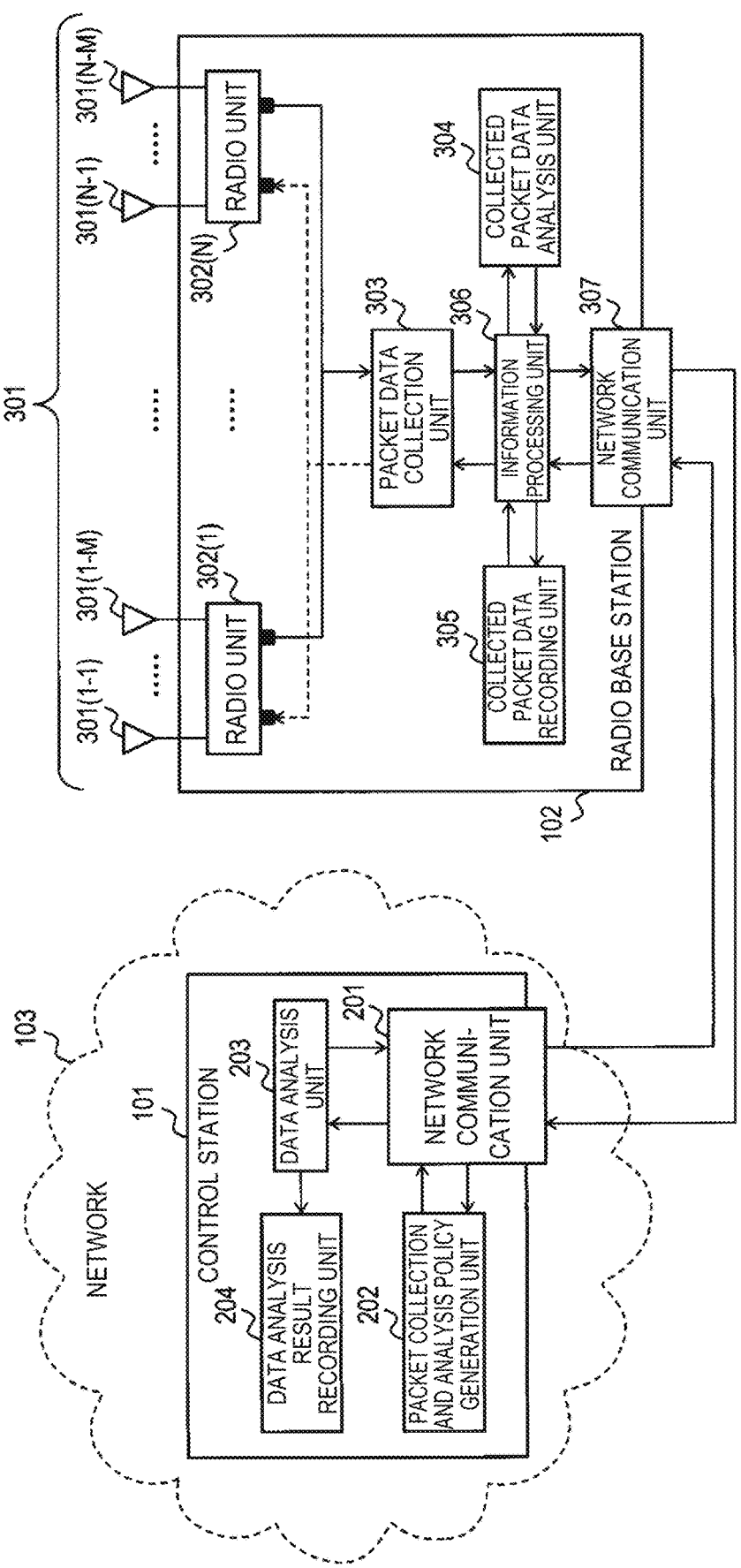
FIG. 2 is a diagram showing an exemplary configuration of a control station and a radio base station according to the present embodiment.

FIG. 2 is a diagram showing an exemplary configuration of the control station 101 and the radio base station 102 according to the present embodiment.

<Control Station 101>

In FIG. 2, the control station 101 will be described first. The control station 101 includes a network communication unit 201, a packet collection and analysis policy generation unit 202, a data analysis unit 203, and a data analysis result recording unit 204. Note that functional blocks mounted on a typical control station are omitted.

The network communication unit 201 performs transmission and reception of various types of information described below with the radio base stations 102 via the network 103. For example, the network communication unit 201 receives base station performance information from the radio base station 102 via the network 103 and outputs it to the packet collection and analysis policy generation unit 202, and transmits a packet collection and analysis policy (information including policy No., a packet collection policy, and a packet analysis policy) generated by the packet collection and analysis policy generation unit 202 to the radio base station 102 via the network 103. Further, the network communication unit 201 receives collected packet data and collected packet analysis result information from the radio base station 102 via the network 103 and outputs them to the data analysis unit 203, and transmits a collected packet data acquisition signal, output by the data analysis unit 203, to the radio base station 102 via the network 103.

The packet collection and analysis policy generation unit 202 generates a packet collection and analysis policy on the basis of the base station performance information received from the radio base station 102 via the network communication unit 201, and transmits it to the radio base station 102 via the network communication unit 201.

The data analysis unit 203 performs data analysis on the basis of the collected packet data and the collected packet analysis result information received from the radio base station 102 via the network communication unit 201. Data analysis is, for example, a process of checking whether or not a trouble has occurred, and when a trouble has occurred, analyzing the collected packet analysis result information to find the cause of the trouble. Then, in the case of performing detailed analysis, the data analysis unit 203 transmits a collected packet data acquisition signal to the radio base station 102 to thereby be able to cause the radio base station 102 to directly transmit the collected packet data to the control station 101. This is because the data analysis unit 203 acquires the collected packet data of the collected packet analysis result information from the radio base station 102. Here, a collected packet data acquisition signal is a control signal notified to the radio base station 102 by the control station 101.

The data analysis result recording unit 204 receives data analysis result information output from the data analysis unit 203 and records it on a recording medium such as a memory.

Here, base station performance information is information indicating performance of radio communication held by the radio base station 102. For example, it includes the number of radio units 302 in the radio base station 102 described below, the number of antennas 301, supporting radio communication standard, and the like.

As described above, the control station 101 is able to transmit a packet collection and analysis policy to the connected radio base station 102 via the network 103, and receive collected packet data and collected packet analysis result information from the radio base station 102, to thereby perform data analysis. Note that a packet collection and analysis policy will be described in detail below.

<Radio Base Station 102>

Next, the radio base station 102 will be described. In FIG. 2, the radio base station 102 includes a plurality of radio units 302 having a plurality of antennas 301, a packet data collection unit 303, a collected packet data analysis unit 304, a collected packet data recording unit 305, an information processing unit 306, and a network communication unit 307. Note that functional blocks mounted on a typical radio base station are omitted.

M pieces (M is a positive integer) of antennas 301 are provided to each radio unit 302. For example, a radio unit 302(1) includes antennas 301(1-1) to 301(1-M), and a radio unit 302(N) include antennas 301(N-1) to 301(N-M). Here, regarding an antenna 301(previous number-following number), the previous number represents the number of the radio unit 302 and the following number represents the number of the antenna 301 in the same radio unit 302. For example, the third antenna of the radio unit 302(N) is denoted as an antenna 301(N-3).

There are N units of radio units 302 namely a radio unit 302(1) to a radio unit 302(N) for communicating with a radio terminal station. Each radio unit 302 has two functions, namely an operation mode switching function and a packet collection function. In the operation mode switching function, based on the setting of the packet data collection unit 303, the operation mode of the radio unit 302 itself is switched between a radio base station mode and a packet collection mode. In the radio base station mode, the radio unit 302 operates as the radio base station 102. In the packet collection mode, the radio unit 302 collects radio packets received by the antenna 301 and outputs them to the packet data collection unit 303.

The packet data collection unit 303 has two functions, namely an operation mode setting function and a packet data collection function. In the operation mode setting function, based on a packet collection policy of a packet collection and analysis policy input from the information processing unit 306, the packet data collection unit 303 determines whether or not a collection condition in the packet collection policy is satisfied, and when the collection condition is satisfied, sets a packet collection mode or a radio base station mode to each radio unit 302. In the packet data collection function, the packet data collection unit 303 collects radio packets input from the radio unit 302, and outputs them as collected packet data to the information processing unit 306.

The collected packet data analysis unit 304 receives an input of the packet collection and analysis policy from the information processing unit 306 and sets it to itself, also receives an input of the collected packet data from the information processing unit 306 and performs analysis on the collected packet data on the basis of the packet analysis policy of the packet collection and analysis policy, and outputs the result as collected packet analysis result information to the information processing unit 306.

The collected packet data recording unit 305 receives an input of packet data from the information processing unit 306 and records it on a recording medium such as a memory, also receives an input of a collected packet acquisition signal from the information processing unit 306, and outputs the corresponding collected packet data to the information processing unit 306. Note that the collected packet data recording unit 305 can prevent enlargement of the capacity of packet data as described below, each time packet data is newly recorded. Here, the collected packet data recording unit 305 deletes old packet data by new packet data, or periodically checks packet data and deletes packet data in which a certain time has passed from the recording.

The information processing unit 306 transmits base station performance information of the own radio base station 102 to the control station 101 via the network communication unit 307 and the network 103, receives a packet collection and analysis policy from the control station 101 via the network communication unit 307, and outputs it to the packet data collection unit 303 and the collected packet data analysis unit 304. Moreover, the information processing unit 306 outputs the packet data output from the packet data collection unit 303 to the collected packet data analysis unit 304 and the collected packet data recording unit 305, and transmits collected packet analysis result information output from the collected packet data analysis unit 304 to the control station 101 via the network communication unit 307. Furthermore, the information processing unit 306 receives a collected packet acquisition signal from the control station 101 via the network communication unit 307, outputs it to the collected packet data recording unit 305, receives collected packet data from the collected packet data recording unit 305, and transmits it to the control station 101 via the network communication unit 307.

The network communication unit 307 transmits the base station performance information of the own station output from the information processing unit 306 to the control station 101 via the network 103, and outputs the packet collection and analysis policy received from the control station 101 via the network 103 to the information processing unit 306. Moreover, the network communication unit 307 transmits the collected packet analysis result information output from the information processing unit 306 to the control station 101 via the network 103, and outputs the collected packet acquisition signal received from the control station 101 via the network 103 to the information processing unit 306. Furthermore, the network communication unit 307 receives collected packet data from the information processing unit 306, and transmits it to the control station 101 via the network 103.

As described above, the radio base station 102 receives a packet collection and analysis policy from the control station 101 and performs collection and analysis of packet data communicated from the radio unit 302, and transmits collected packet data and collected packet analysis result information to the control station 101.

FIG. 3 illustrates examples of packet collection policies and packet analysis policies. In FIG. 3, for each of the policy Nos. (I and II), examples of a collection item, a collection method, and a collection condition are shown as a packet collection policy, and examples of an analysis item, an analysis method, and a determination condition are shown as a packet analysis policy. Here, as illustrated in FIG. 3, the packet collection and analysis policy includes information about the policy No., a packet collection policy, and a packet analysis policy.

(Packet Collection Policy)

A packet collection policy includes a collection item, a collection method, and a collection condition. The collection item is a definition of packets to be collected including packets transmitted and received by the own station and packets transmitted and received by those other than the own station, for example. The collection method shows a definition of a method of collecting packets, including execution timing of packet collection, collection time, radio channel to be collected, for example. The collection condition is a condition for executing packet collection, including a connecting state of a radio terminal station to the own station, for example.

In the example of policy No. I in FIG. 3, according to the collection item, packets to be collected are "all packets being transmitted and received by the own station", according to the collection method, the execution timing is every one hour, the collection time is one minute, and the radio channel to be collected is a communication channel of the own station, and according to the collection condition, a condition for executing packet collection is "one or more terminals are connected to the own station".

In the example of policy No. II in FIG. 3, according to the collection item, packets to be collected are "all packets being transmitted and received by those other than the own station", according to the collection method, the execution timing is every one hour, the collection time is one minute, and the radio channel to be collected is a communication channel of the own station, and there is on collection condition.

The packet collection policy is determined according to how packet collection and analysis are performed, on the basis of the number of radio units in the base station performance information, information about the number of antennas and supporting radio communication standard, and the like. For example, in the case of analyzing the communication state of the own station, it is considered to designate all packets being transmitted and received by the own station in the collection item, while in the case of analyzing an interference signal received by the own station from surrounding radio stations (including another radio base station, a radio terminal, or a radio device in which the band is overlapped, or the like), it is considered to designate all packets being transmitted and received by those other than the own station in the collection item. Moreover, for the collection frequency provided by the execution timing defined by the collection method or the like, it can be set while taking into account the influence on the radio communication. Furthermore, in the case where the collection frequency and the collection time are high/long, it is considered that the influence on the radio communication is large but the accuracy of collected information is improved, while in the case where the collection frequency and the collection time is low/short, it is considered that the influence on the radio communication is small but the accuracy of the collected information is lowered. The same applies to the collection condition. In order to suppress the influence on the radio communication as much as possible, it is necessary to perform collection at the timing that a radio terminal station is not connected to the own station as much as possible. However, the timing that packet collection can be performed is limited. Further, in a state where no radio terminal station is connected, since the own station does not perform transmission and reception of packet to/from a radio terminal station, it is necessary to perform packet collection when one or more radio terminal stations are connected.

(Packet Analysis Policy)

In FIG. 3, the packet analysis policy includes an analysis item, an analysis method, and a determination condition. The analysis item is an item name of packet analysis. The analysis method includes specific analysis contents such as retransmission packet rate, data rate, Reason Code, received power, for each destination, each source, each traffic direction (upstream direction/downstream direction) and the like. Further, the determination condition includes a condition for performing determination on the packet analysis result, and the like.

In the example of policy No. I in FIG. 3, as the analysis item, the analysis method, and the determination condition, the following contents are defined, respectively. As the analysis items, retransmission rate, data rate, radio disconnection signal, received power, and the like are defined. As the analysis method, average retransmission packet rate, average data rate, and average received power for each destination and for each upstream and downstream directions, Reason Code in a signal, and the like are defined. As the determination condition, it is defined that the retransmission packet rate is 20% or less, the data rate is 16 Mbps or higher, Reason Code is in a defined range, received power is −75 dBm or more, and the like.

Further, in the example of the policy No. II in FIG. 3, as analysis items, the traffic amount, airtime (time during which radio communication is made), and the like are defined, and as analysis methods, average traffic, airtime occupancy rate, and the like for each destination and each of upstream and downstream directions are defined. Note that the example of the policy No. II in FIG. 3 does not have a determination condition.

In the packet analysis policy, an analysis methods and a determination condition are set for each analysis item in advance, and for each policy No. of the packet collection and analysis policy, it is possible to determine whether or not to apply the content of each analysis item on the basis of information such as the number of radio units in the base station performance information, the number of antennas and the corresponding radio communication standard and the like, to define an analysis method and a determination condition.

Here, in the setting example of FIG. 3, since there is generally a case where the retransmission packet rate is 5% to 10% even in radio communication in a state with no problem, it is preferable to perform determination by setting a determination condition to be higher. Further, in the data rate and the received power, it is possible to determine the magnitude with respect to a previously estimated value, and for a radio disconnection signal, it is possible to determine whether or not Reason Code that is hardly estimated in general radio communication is detected.

FIG. 4 illustrates examples of collected packet data. As illustrated in FIG. 4, collected packet data is a set of data in which radio communication packets are collected as they are, including packet information, radio information, and payload information, for example. Packet information includes information such as packet No. and date/time, for example, as information related to the entire packets. Radio information includes, for example, source Media Access Control (MAC) address, destination MAC address, communication protocol, data size, radio parameter, and the like, as information related to radio communication. Payload information includes information of data part transmitted and received by means of radio packets, such as source Internet Protocol (IP) address, destination IP address, communication protocol, and data size, for example.

In the example of packet No. 1 in FIG. 4, as packet information, date/time of 2018/09/12, 15:30:01 is included, and as radio information, information that the source MAC address is aa:bb:cc:dd:ee:ff, destination MAC address is ab:cd:ef:ab:cd:ef, communication protocol is Data, data size is 1500 Byte, and the like is included. As payload information, information that the source IP address is 1.1.1.1, destination IP address is 2.2.2.2, communication protocol is TCP, data size is 1450 Byte, and the like is included. The same applied to the examples of packet No. 2 and packet No 3 in FIG. 4.

FIG. 5 illustrates examples of collected packet analysis result information. As illustrated in FIG. 5, collected packet analysis result information is result information of analysis performed on collected packet data that is collected on the basis of packet collection policy included in the packet collection and analysis policy generated by the packet collection and analysis policy generation unit 202, on the basis of packet analysis policy included in the packet collection and analysis policy. For example, information such as No. of each result information (result information No.), radio base station No., packet collection and analysis policy No., packet collection date/time, packet analysis date/time, packet analysis result, and packet determination result are included.

In the example of result information No. 1 of FIG. 5, the radio base station No. is 102(1) (corresponding to the radio base station 102(1) of FIG. 1), the packet collection and analysis policy No. is policy No. I of FIG. 3, the packet collection date/time is 2018/09/12, 16:16, and packet analysis date/time is 2018/09/12, 16:17. As a packet analysis result, information that the retransmission packet rate: 4%, data rate: average 42 Mbps, radio disconnection signal: no deviation from a prescribed range, received power: −65 dBm is included, and as a packet determination result, information that retransmission packet rate: OK, data rate: OK, radio disconnection signal: OK, and received power: OK is included. The same applies to the example of the radio base station No. 102(N) (corresponding to radio base station 102(N) in FIG. 1) of the policy No. 2 in FIG. 5.

Figure 6:
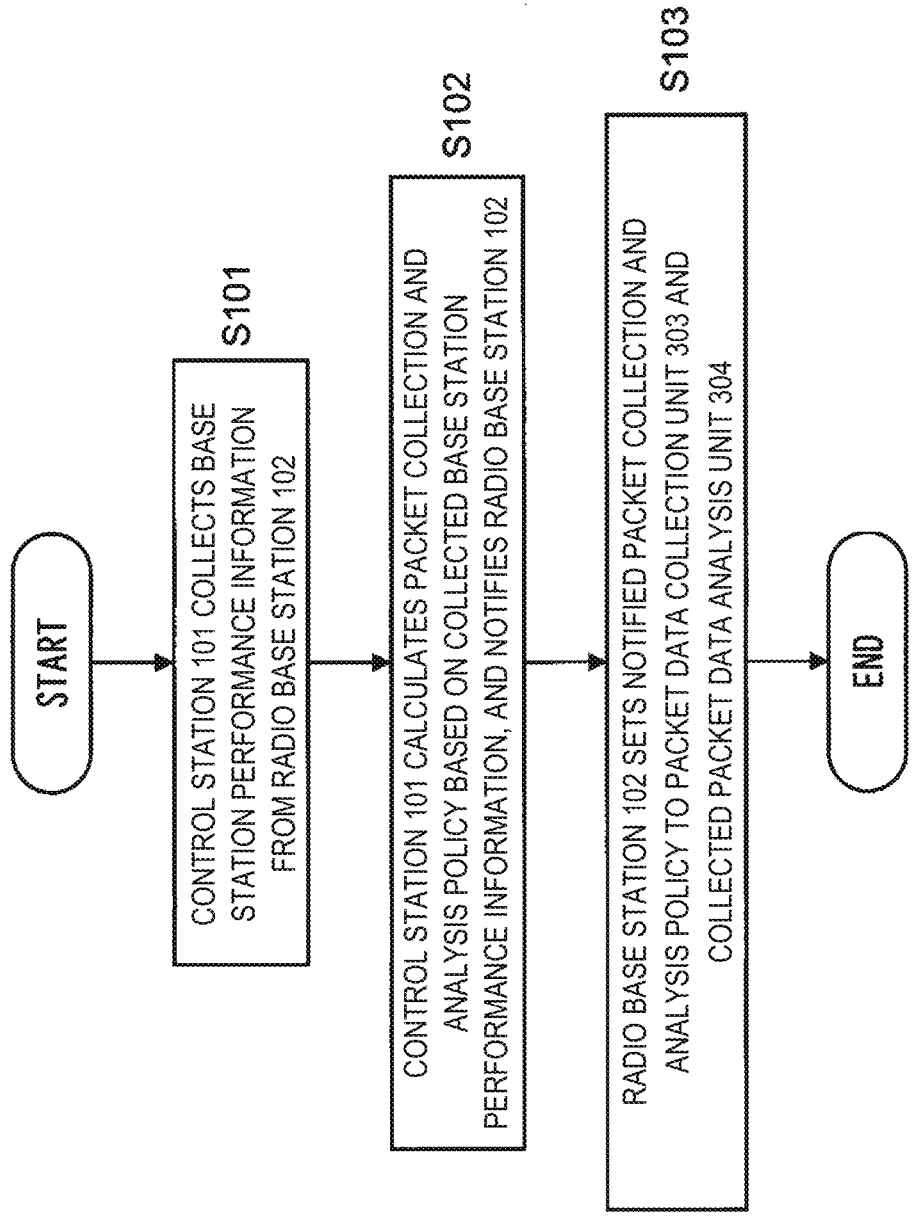
FIG. 6 illustrates an example of an initial setting process.

FIG. 6 illustrates an example of an initial setting process. Note that the process illustrated in FIG. 6 is executed by the respective blocks of the control station 101 and the radio base station 102 illustrated in FIG. 2.

At step S101, the control station 101 collects base station performance information from the radio base station 102.

At step S102, on the basis of the base station performance information collected from the radio base station 102, the control station 101 generates a packet collection and analysis policy, and notifies the radio base station 102 of it.

At step S103, the radio base station 102 sets the packet collection and analysis policy, notified from the control station 101, to the packet data collection unit 303 and the collected packet data analysis unit 304 of the own station.

In this way, initial setting to the control station 101 and the radio base station 102 is completed.

Figure 7:
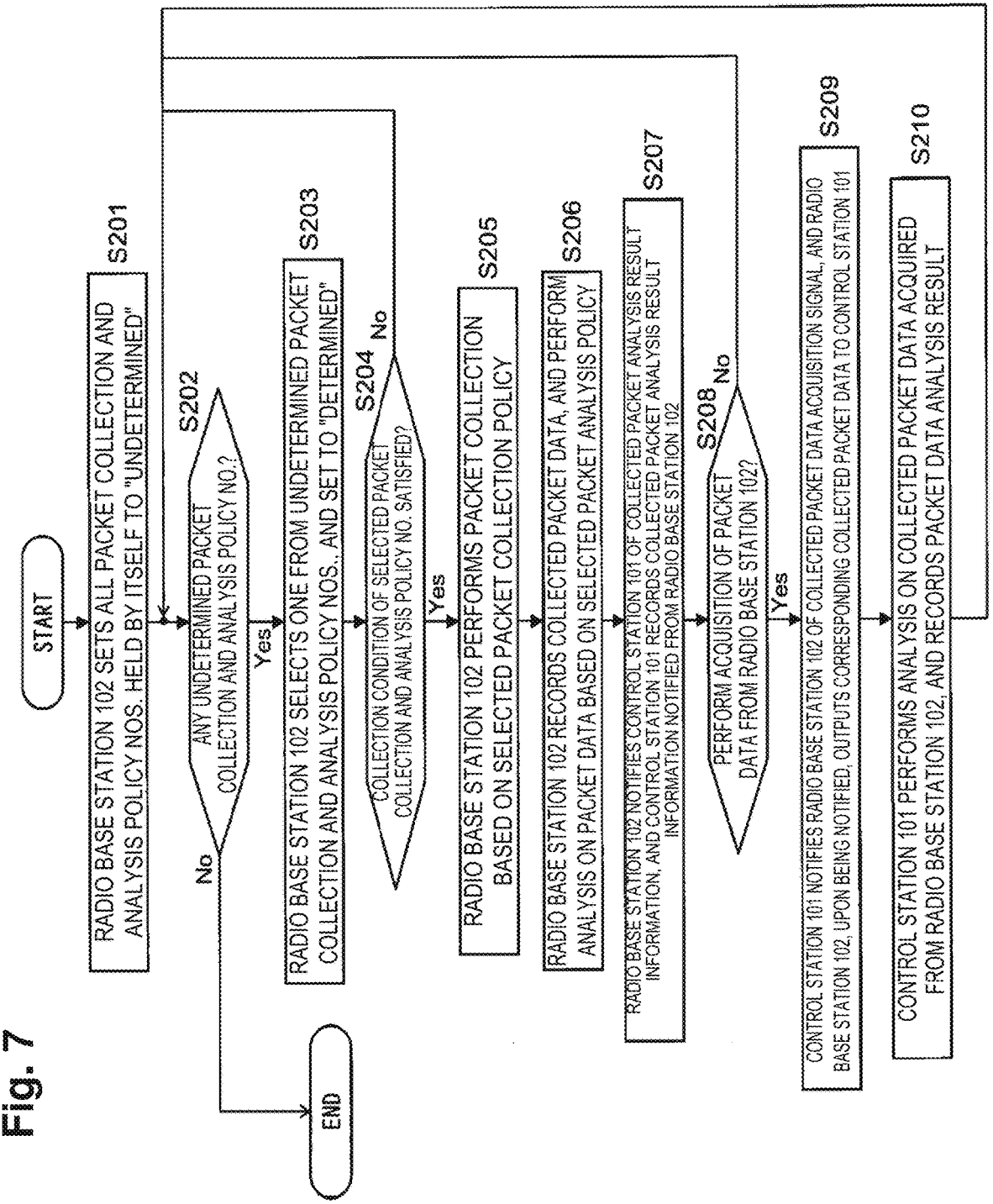
FIG. 7 illustrates an example of a packet collection and analysis process.

FIG. 7 illustrates an example of a packet collection analysis process. Note that the process illustrated in FIG. 7 is executed by the respective blocks of the control station 101 and the radio base station 102 illustrated in FIG. 2.

At step S201, the radio base station 102 sets all packet collection and analysis policy Nos. held by it to "undetermined".

At step S202, the radio base station 102 determines whether or not an undetermined packet collection and analysis policy No. exists, and when exists, the radio base station 102 proceeds to step S203, while when no such policy No. exists, ends the process.

At step S203, the radio base station 102 selects one of undetermined packet collection and analysis policy Nos., and sets it to "determined".

At step S204, the radio base station 102 determines whether or not the collection condition in the packet collection policy corresponding to the selected packet collection and analysis policy No. is satisfied, and when the condition is satisfied, the radio base station 102 proceeds to step S205, while when the condition is not satisfied, returns to step S202.

At step S205, the radio base station 102 performs packet collection on the basis of the packet collection policy of the selected packet collection and analysis policy No.

At step S206, the radio base station 102 records the collected packet data, and further performs analysis on the collected packet data on the basis of the content of the packet analysis policy in the selected packet collection and analysis policy.

At step S207, the radio base station 102 notifies the control station 101 of the collected packet data analysis result information, and the control station 101 records the collected packet data analysis result information notified from the radio base station 102.

At step S208, the control station 101 determines whether or not to perform acquisition of collected packet data from the radio base station 102 on the basis of the collected packet data analysis result information, and in the case of acquiring it, the control station 101 proceeds to step S209, while in the case of not acquiring it, returns to step S202.

At step S209, the control station 101 notifies the radio base station 102 of a collected packet data acquisition signal, and when the radio base station 102 receives the notice, the radio base station 102 outputs the corresponding collected packet data recorded in the own station, to the control station 101.

At step S210, the control station 101 performs analysis on the collected packet data acquired from the radio base station 102 and records the analysis result. Then, the control station 101 returns to step S202. Note that in this analysis, for example, when there is a disconnected packet that is not generated generally, it is found that there is a high possibility that a problem has been caused due to the packet. Further, the affected range of the problem, that is, whether the problem is caused with respect to only one terminal or is common to a plurality of radio terminal stations connected to the radio base station, can be grasped by the analysis.

As described above, the control station 101 and the radio base station 102 according to the present embodiment can perform processing of packet collection and analysis. Here, the radio base station 102 periodically performs the process of FIG. 7, whereby each radio base station 102 performs collection and analysis of packet data on the basis of the packet collection and analysis policy set autonomously, and notifies the control station 101 of the analysis result information. Then, based on the analysis result information notified from the radio base station 102, the control station 101 can further acquire collected packet data from the radio base station 102 and perform detailed analysis.

Note that the control station 101 and the radio base station 102 in the embodiment described above are not limited to those implemented by dedicated devices but may be implemented by general-purpose computers. In that case, the control station 101 and the radio base station 102 may be realized by recording a program for implementing the functions on a computer-readable recording medium, and allowing the program recorded on the recording medium to be read by a computer system to be executed. Here, "computer system" includes OS and hardware such as peripheral devices. Moreover, "computer-readable recording medium" means a portable medium such as a flexible disk, magnetooptical disk, ROM, or CD-ROM, or a storage device such as a hard disk installed in the computer system. Note that the "computer-readable recording medium" may include one that dynamically stores a program in a short period on a communication line when the program is transmitted via a network such as the Internet or a communication line such as a telephone line, that is, one storing a program for a certain period of time like a volatile memory in a computer system serving as a server or a client, for example. Furthermore, the program described above may be one for implementing part of the functions described in the embodiment, or may be one by which the function described above can be implemented by a combination with a program having been recorded in the computer system. For example, it may be one implemented with use of hardware such as Programmable Logic Device (PLD) or Field Programmable Gate Array (FPGA), for example.

While the embodiment of the present invention has been described with reference to the drawings, the embodiment is merely an example of the present invention. It is clearly understood that the present invention is not limited to the embodiment described above. Accordingly, addition, omission, replacement, and other changes can be made within a range not being deviated from the technical concept and the scope of the present invention.

REFERENCE SIGNS LIST

100 Radio communication system
101 Control station
102 Radio base station
103 Network
201, 307 Network communication unit
202 Packet collection and analysis policy generation unit
203 Data analysis unit
204 Data analysis result recording unit
301 Antenna
302 Radio unit
303 Packet data collection unit
304 Collected packet data analysis unit
305 Collected packet data recording unit
306 Information processing unit

The invention claimed is:

1. A radio communication system comprising:
at least one radio base station device; and
a control station device that controls the radio base station device,
wherein
the radio base station device includes:
a plurality of radio units that perform communication of packet data with a radio terminal device;
a packet data collection unit that collects the packet data communicated by the plurality of the radio units, on a basis of a packet collection policy received from the control station device, the packet collection policy including a collection item, a collection method, and a collection condition;
a collected packet data analysis unit that performs analysis on the packet data collected by the packet data collection unit on a basis of a packet analysis policy received from the control station device, and transmits analysis result information to the control station device, the packet analysis policy including an analysis item, an analysis method, and a determination condition; and
an information processing unit that transmits base station performance information of own device and the analysis result information to the control station device, and receives the packet collection policy and the packet analysis policy from the control station device, and
the control station device includes:
a packet collection and analysis policy generation unit that generates and transmits the packet collection policy and the packet analysis policy to the radio base station device, on a basis of the base station performance information received from the radio base station device; and
a data analysis unit that analyzes the analysis result information notified from the radio base station device.

2. The radio communication system according to claim 1, wherein
the data analysis unit transmits a collected packet data acquisition signal to the radio base station device, and causes the packet data corresponding to the analysis result information collected by the packet data collection unit of the radio base station device to be transmitted to the control station device.

3. The radio communication system according to claim 2, wherein
the radio base station device determines whether or not the collection condition in the packet collection policy is satisfied, and when the collection condition is satisfied, the radio base station device performs collection of the packet data.

4. A control station device that controls at least one radio base station device, the control station device comprising:
a packet collection and analysis policy generation unit that generates and transmits a packet collection policy and a packet analysis policy to the radio base station device, on a basis of base station performance information received from the radio base station device,
the packet collection policy including a collection item, a collection method, and a collection condition, and
the packet analysis policy including an analysis item, an analysis method, and a determination condition; and a data analysis unit that analyzes analysis result information that is collected and analyzed by the radio base station device on a basis of the packet collection policy and the packet analysis policy.

5. The control station device according to claim 4, wherein
the data analysis unit transmits a collected packet data acquisition signal to the radio base station device, and causes packet data corresponding to the analysis result information collected by the radio base station device to be transmitted.

6. At least one radio base station device to be controlled by a control station device, the radio base station device comprising:
a plurality of radio units that perform communication of packet data with a radio terminal device;
a packet data collection unit that collects the packet data communicated by the plurality of the radio units, on a basis of a packet collection policy received from the control station device,
the packet collection policy including a collection item, a collection method, and a collection condition;
a collected packet data analysis unit that performs analysis on the packet data collected by the packet data collection unit on a basis of a packet analysis policy received from the control station device, and transmits analysis result information to the control station device,
the packet analysis policy including an analysis item, an analysis method, and a determination condition; and
an information processing unit that transmits base station performance information of own device and the analysis result information to the control station device, and receives the packet collection policy and the packet analysis policy from the control station device.

7. The radio base station device according to claim 6, wherein
when the information processing unit receives a collected packet data acquisition signal from the control station device, the information processing unit transmits the packet data corresponding to the analysis result information to the control station device.

8. The radio base station device according to claim 7, wherein
the packet data collection unit determines whether or not the collection condition in the packet collection policy is satisfied, and when the collection condition is satisfied, the packet data collection unit performs collection of the packet data on a basis of the packet data collection policy.

* * * * *